(12) United States Patent
Butler

(10) Patent No.: US 11,789,178 B2
(45) Date of Patent: Oct. 17, 2023

(54) GROUND PENETRATING RADAR STENCIL AND SYSTEM FOR USING THE SAME

(71) Applicant: James Butler, Grayslake, IL (US)

(72) Inventor: James Butler, Grayslake, IL (US)

(73) Assignee: BUTLER SCANNING, INC., Libertyville, IL (US)

( * ) Notice: Subject to any disclaimer, the term of this patent is extended or adjusted under 35 U.S.C. 154(b) by 562 days.

(21) Appl. No.: 17/121,676

(22) Filed: Dec. 14, 2020

(65) Prior Publication Data

US 2021/0181371 A1 Jun. 17, 2021

Related U.S. Application Data

(60) Provisional application No. 62/948,679, filed on Dec. 16, 2019.

(51) Int. Cl.
*G01V 15/00* (2006.01)
*B43L 13/20* (2006.01)
*G01S 13/88* (2006.01)
*G01S 13/00* (2006.01)

(52) U.S. Cl.
CPC ............ *G01V 15/00* (2013.01); *B43L 13/208* (2013.01); *G01S 13/885* (2013.01)

(58) Field of Classification Search
None
See application file for complete search history.

(56) References Cited

U.S. PATENT DOCUMENTS

| | | | |
|---|---|---|---|
| 6,670,906 B1 * | 12/2003 | Roberts | G01S 5/16 342/22 |
| 7,057,548 B1 * | 6/2006 | Roberts | G01S 5/16 342/52 |
| 10,209,357 B2 * | 2/2019 | Rhead | G01S 7/24 |
| 10,254,398 B2 * | 4/2019 | Ghazanfarpour | G01S 7/20 |
| 10,930,078 B1 * | 2/2021 | Côté | G06T 19/20 |
| 2017/0323480 A1 * | 11/2017 | LaBarca | G01S 13/885 |
| 2021/0095788 A1 * | 4/2021 | Dunn | G01V 15/00 |

FOREIGN PATENT DOCUMENTS

GB 2329043 A * 3/1999 ............. G01V 1/282

* cited by examiner

*Primary Examiner* — Bernarr E Gregory
(74) *Attorney, Agent, or Firm* — Justin Lampel

(57) ABSTRACT

A ground penetrating radar stencil and system for using the same is provided. The stencils are reusable. The stencils are foldable, allowing for storing and transportation. A first data collection grid stencil is used to mark a grid followed by alternative target marking stencils used to mark utility line and structural support lines. Indelible stencil paint/ink is applied on and through the stencils onto the concrete surfaces to provide for a permanent, standardized and consistent marking of critical embedded infrastructure. The system allows for a uniform collecting and recording of the scanning data results for future reference and work in the same area.

18 Claims, 8 Drawing Sheets

GROUND PENETRATING RADAR STENCIL AND SYSTEM FOR USING THE SAME

REFERENCE TO RELATED APPLICATIONS

This application claims priority to U.S. Provisional Application No. 62/948,679 which was filed on Dec. 16, 2019, the entire contents of which are incorporated by reference herein.

BACKGROUND OF THE INVENTION

A ground penetrating radar stencil and system for using the same is provided. The stencils are preferably made of Mylar® and are reusable. The stencils are foldable, allowing for storing and transportation in carrying cases or backpacks. A first data collection grid stencil is used to mark a grid followed by alternative target marking stencils used to mark utility line and structural support lines drawn with surrounding safety zones illustrated. Indelible stencil paint/ink is applied on and through the stencils onto the concrete surfaces to provide for a permanent, standardized and consistent marking of critical embedded infrastructure. The system allows for a uniform collecting and recording of the scanning data results for future reference and work in the same area.

Ground penetrating radar systems are common. For example, U.S. Pat. No. 6,552,285 to Stolarczyk discloses a ground-penetrating radar having a single resonant microstrip patch antenna (RMPA) that is driven by a three-port directional coupler. A reflected-wave output port is buffered by a wideband isolation amplifier and a reflected-wave sample is analyzed to extract measured values of the real and imaginary parts of the load impedance-the driving point impedance of RMPA. Each such port will vary in a predictable way according to how deeply an object is buried in the soil. Calibration tables can be empirically derived. Reflections also occur at the interfaces of homogeneous layers of material in the soil. The reflected-wave signals are prevented from adversely affecting transmitted-signal sampling by putting another wideband isolation amplifier in front of the input port of the directional coupler. A suppressed-carrier version of the transmitted signal is mixed with the reflected-wave sample, and the carrier is removed. Several stages of filtering result in a DC output that corresponds to the values of the real and imaginary parts of the load impedance. The suppressed-carrier version of the transmitted signal is phase shifted 0.degree. or 90.degree. to select which part is to be measured at any one instant.

Further, U.S. Pat. No. 10,451,726 to Jazayeri discloses a method for FWI of common-offset ground penetrating radar (GPR) data, particularly targeting the dimensions and infilling material of buried objects. The method is useful in situations where clear isolated diffraction hyperbolas indicate the presence of an underground object, but the object's dimensions and filling may be unknown. The present invention acquires GPR data and applies advanced numerical methods to get the depth and size of the underground object in a very accurate manner. An embodiment of the invention includes five main steps: GPR data processing, ray-based analysis to set a good initial model, 3D to 2D transformation of data, effective SW estimation, and FWI.

Still further, U.S. Pat. No. 6,617,996 to Johansson discloses a ground penetrating radar system having a processor for generating audible output signals having discrete frequency components representative of the depth of buried targets. The amplitude of the audible frequency components is representative of the size or mass of the target.

However, these patents fail to describe a ground penetrating radar stencil and system for using the same which is easy to use. Further, these patents fail to provide for a ground penetrating radar stencil and system for using the same which uses a foldable, reusable stencil system.

SUMMARY OF THE INVENTION

A ground penetrating radar stencil and system for using the same is provided. The stencils are preferably made of Mylar® and are reusable. The stencils are foldable, allowing for storing and transportation in carrying cases or backpacks. A first data collection grid stencil is used to mark corresponding GPR manufacturers scanning devices data collection grids to allow for the collection of GPR Survey data. Secondly, target marking stencils are utilized to mark drawn embedded utilities and structural steel support embodiments. Additionally, tolerance zone target marking stencils mark tolerance (no cut, no drill, no core drill tolerance zones) zones around utility line and structural support lines drawn to mark surrounding safety zones illustrated. Indelible stencil paint/ink is applied on and through the stencils onto the concrete surfaces to provide for a permanent, standardized and consistent marking of critical embedded infrastructure. The system allows for a uniform collecting and recording of the scanning data results for future reference and work in the same area.

The stencils of the present apparatus and system may be broken down into the following types:

I. Data Collection Grid Stencils:

These folding, compact grids are designed to replace the plastic or paper data collection grids which are presently provided by the manufacture in typical systems. The present Mylar® data collection grid stencils of the present application may have data points which may be cut-out to allow for an operator to mark the collection points on the concrete surface prior to grid scanning with the scanning radar machine. Upon the completion of grid scan, the data collection is processed in the radar machine and a 2D and/or 3D image appears on the operator's monitor for analyzation. The data collected is then analyzed and the surface is marked to indicate the survey areas embedded infrastructure, i.e.; conduits, rebar, post tension cables, beams, communication lines, etc.

II. Target Marking Stencils:

The Target Marking stencils are used to indicate and mark the embedded infrastructure in 1", 1.5", 2" & 3" wide marking paths. These stencils are generally used after the ground is first marked using the Data Collection stencils. These Target Marking stencils may come in different forms including, for example:

A. GPR TARGET: For marking of infrastructure of unknown origin and or/rebar.
B. OBSTRUCTION: For marking of infrastructure (with a series of hash marks) of unknown origin and or/rebar.
C. LIVE POWER: For marking of current carrying conduits as determined by the EM (electromagnetic) sensor on the scanning machine.
D. CONDUIT: For marking of targets determined through analysis to be a conduit or communication line.
E. PT CABLE: For marking of targets determined through analysis to be a post tension (PT) structural support cable.

III. Tolerance "Safety Zone" Stencils:

Type 1: Used to indicate and mark the embedded infrastructure in 3", 3.5", 4", 4.5", 5' & 6" wide marking paths for use on suspended slabs, walls, columns, beams and spandrels.

Type 2: Used to indicate and mark the embedded infrastructure in 18" & 24" wide marking paths on slab on grade applications.

Type 1 comes in 4 forms:

GPR TARGET: For marking of infrastructure and "no core layout tolerance zones" of unknown origin and or/rebar.

LIVE POWER: For marking of current carrying conduits and "no core layout tolerance zones" as determined by the EM (electromagnetic) sensor on the scanning machine.

CONDUIT: For marking of targets and "no core layout tolerance zones" as determined through analysis to be a conduit or communication line.

PT CABLE: For marking of targets and "no core layout tolerance zones" as determined through analysis to be a post tension structural support cable.

IV. Informational Stencils:

The present stencils and stencil system may be implemented to indicate and communicate the location, depth, orientation and layout of, for example, beams, hollow areas, walker ducts and the type of slab being scanned as well as to record the date the scan was taken, the floor the scan was taken, the level the scan was taken, the location of safe core zones and the location of safe cut zones, etc. Further, the present system allows for the collecting and recording of the scanning data results for future reference and for future work in the same area. The present mobile and web-based application system is designed to improve communication, reduce confusion and increase awareness of known utilities and structural embedments.

An advantage of the present ground penetrating radar stencil and system is that the present ground penetrating radar stencil and system may use a clear, consistent and uniform stencil system for marking critical embedded infrastructure in areas to be drilled or cut.

And an advantage of the present ground penetrating radar stencil and system for using the same is that the present stencils may be folded so as to fit in a compact location such as, for example, a carrying case or backpack.

Still another advantage of the present ground penetrating radar stencil and system is that the present ground penetrating radar stencil and system is that the present system may issue an "authorize to scan" (ATS) interior utility locate tracking number through a mobile application to the worker to initiate a GPR or a concrete imaging project. The Authorize to Scan locate number may be visibly placed at each location with a sequentially numbered label throughout the GPR survey. In addition, a per location barcode sticker may be placed at each location for future workers to access information of previously marked and recorded infrastructure. The ATS locations may include highly visible survey boundary markings reducing the risk of damages occurring outside of scanned areas.

Another advantage of the present ground penetrating radar stencil and system for using the same is that the present stencil and system may record scanning data for use at a future time during future construction.

Yet another advantage of the present ground penetrating radar stencil and system for using the same is that the present stencil and system may have visible safety tolerance zones indicated on the stencils.

And still another advantage of the present ground penetrating radar stencil and system for using the same is that the present stencil and system provide for standardized units of measurements for marking surfaces using ground penetrating radar.

Another advantage of the present ground penetrating radar stencil and system for using the same is that the present stencil and system may reduce contractor confusion by providing clear and concise marks over embedded infrastructure as well as providing informational language in and around the survey areas. These marks are applied to concrete surfaces in most cases by utilizing Military Grade Indelible Ink that will remain visible for years to come therein alerting future workers of known hidden dangers.

Another advantage of the present ground penetrating radar stencil and system is that the present ground penetrating radar stencil and system reduces job site accidents and injuries. GPR workers may utilize standardized GPR and X-Ray marking methods and utilize the smartphone application to improve job site safety, increase communication and reduce risk in the workplace.

Yet another advantage of the present ground penetrating radar stencil and system is that the present ground penetrating radar stencil and system reduces the risk of costly repairs from structural damages from improper cutting or drilling.

Still another advantage of the present ground penetrating radar stencil and system is that the present ground penetrating radar stencil and system may reduce insurance claims and premiums.

Advantages of the Present Uniform Color Code Identifiers Include:

Due to the limitations of GPR, many embedments detected by GPR are in many cases of unknown origin. A uniform interior color code identifier system was created to improve clarity and increase awareness of these limitations. It is acknowledged that The American Public Works Association (AWPA) color code identifiers take precedence over these uniform color codes if marks are applied over "known" (through as-built drawings or known locations of utilities based on previous site information or inspections) embedded targets.

Advantages of the Mobile and Web-Based Application Include:

The present system allows users attach drawings, photos, files and comments to each ATS request.

The present system allows users to track job progression from GPR scheduling to mechanical installation.

The present GPR Survey Report function allows technicians to create real-time survey reports of every location. ATS locations may be photographed, captured and stored utilizing GPS coordinates and recorded within the GPR Survey Report.

The present system allows a user to invite others to view a project and promotes project participants to add vital site-specific information thereby improving communication between the facility and all related trades.

The present system vastly improves communication between the GPR Technicians and the Concrete Cutters.

The present system reduces damages caused by cutting contractors and their operators by allowing them access to the GPR Surveys prior to their arrival.

The present system provides a preview of the site conditions promotes the creation of a thorough, detailed JSA (Job Safety Analysis).

Advantages of the Present Barcode Data Retrieval System Include:

A Unique SafeCore Barcode label may be applied to the outer perimeter of each ATS location which may eliminate costly downtime by allowing current users as well as future managers and contractors immediate access to the archived GPR Reports through their Smartphone camera.

The present system provides safe and secure "cloud based" storage of all GPR Surveys and site-specific data for current and future generations of workers.

The present system allows users to add living Maintenance Logs to all projects to track maintenance, repairs and assist in trouble shooting.

For a more complete understanding of the above listed features and advantages of the ground penetrating radar stencil and system for using the same reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A ground penetrating radar stencil and system for using the same is provided. The stencils are preferably made of Mylar® and are reusable. The stencils are foldable, allowing for storing and transportation in carrying cases or backpacks. A first data collection grid stencil is used to mark a grid followed by alternative target marking stencils used to mark utility line and structural support lines drawn with surrounding safety zones illustrated. Indelible stencil paint/ink is applied on and through the stencils onto the concrete surfaces to provide for a permanent, standardized and consistent marking of critical embedded infrastructure. The system additionally allows for a uniform collecting and recording of the scanning data results for future reference and work in the same area.

Figure 1:
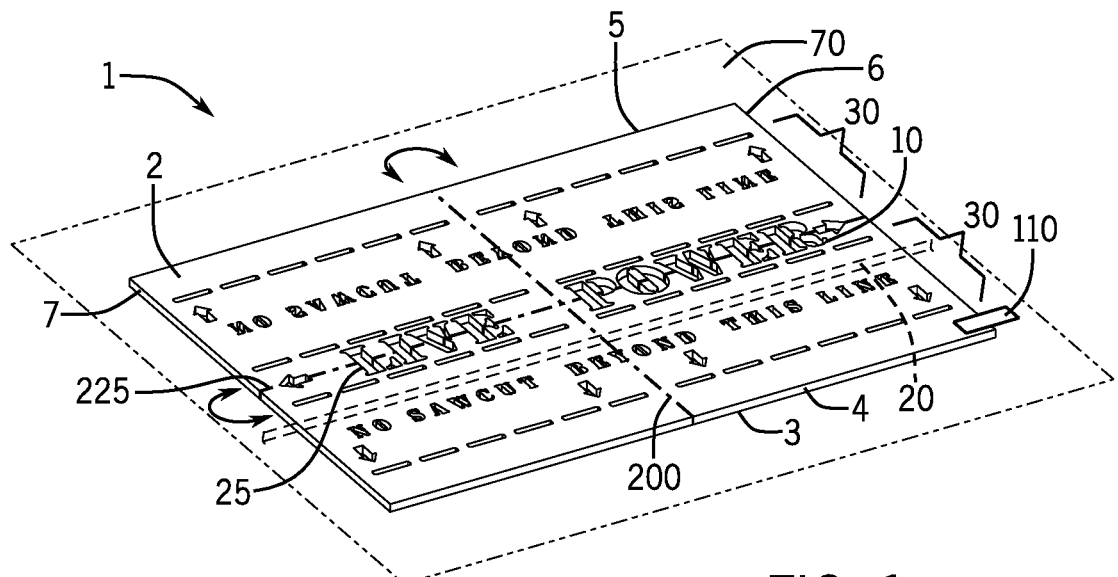
FIG. 1 illustrates a perspective view of one of many alternative versions of a Target Marking stencil of the present stencil and system of using the same in the fully extended form.

Referring first to FIG. 1, a stencil 1 of the present system (which may include multiple stencils) is illustrated. The stencils 1 may be Data Collection grid stencil and/or may be a Target Marking or Target Marking Tolerance Zone stencil. FIG. 1 illustrates a Target Marking stencil which may have preprinted indicia 10 on its surface such as, for example, indicia 10 showing a concealed object line 25 which lets a worker know the precise location of a concealed object 20 (such as, for example, a power line or rebar support locations) which is located under a surface (such as a concrete slab) so as to avoid the object 20 during construction.

In an embodiment, specific color-coded paint or ink may be applied to the top surface of the stencil 1 allowing the color-coded paint or ink to pass through the cut-out indicia 10 on the stencil 1 and therein mark the ground in a color-coded manner so as to provide clear and easy information to the worker. By way of example, applying red paint or ink to a stencil could mean danger while applying green paint or ink may indicate areas which are safe to drill or cut. Deciding which stencil and color to use is based on the readings obtained from a radar scanning device (as discussed below).

The indicia 10 may be cut-out portions that a worker applies paint/ink to so that the markings are visible when the stencil 1 is removed prior to cutting, drilling, etc. In an embodiment, the paint or ink applied to the ground through the cut-out indicia portions 10 may be indelible ink so as to be permanently visible on the ground (for future workers) when the stencil 1 is removed.

As stated above, the indicia 10 may be cut-out portions (or "openings") that a worker applies paint or ink (or other marking elements such as, for example, permanent marker, pencil crayon or chalk) to the top of the stencil 1 so that the marking element is visible when the stencil 1 is removed prior to cutting, drilling, etc. In particular, a worker may apply paint to the top of the stencil 1 so that the actual paint or ink passes through the cut-out indicia 10 portions and reaches the ground, whereas the other paint or ink is blocked from reaching the ground by the top of the stencil 1. As a result, the ground receives the paint or ink in the form/shape of the indicia 10 of the stencil 1 and a worker may use that information to drill or cut accordingly. The stencil 1 may then be cleaned and re-used.

Figure 6:
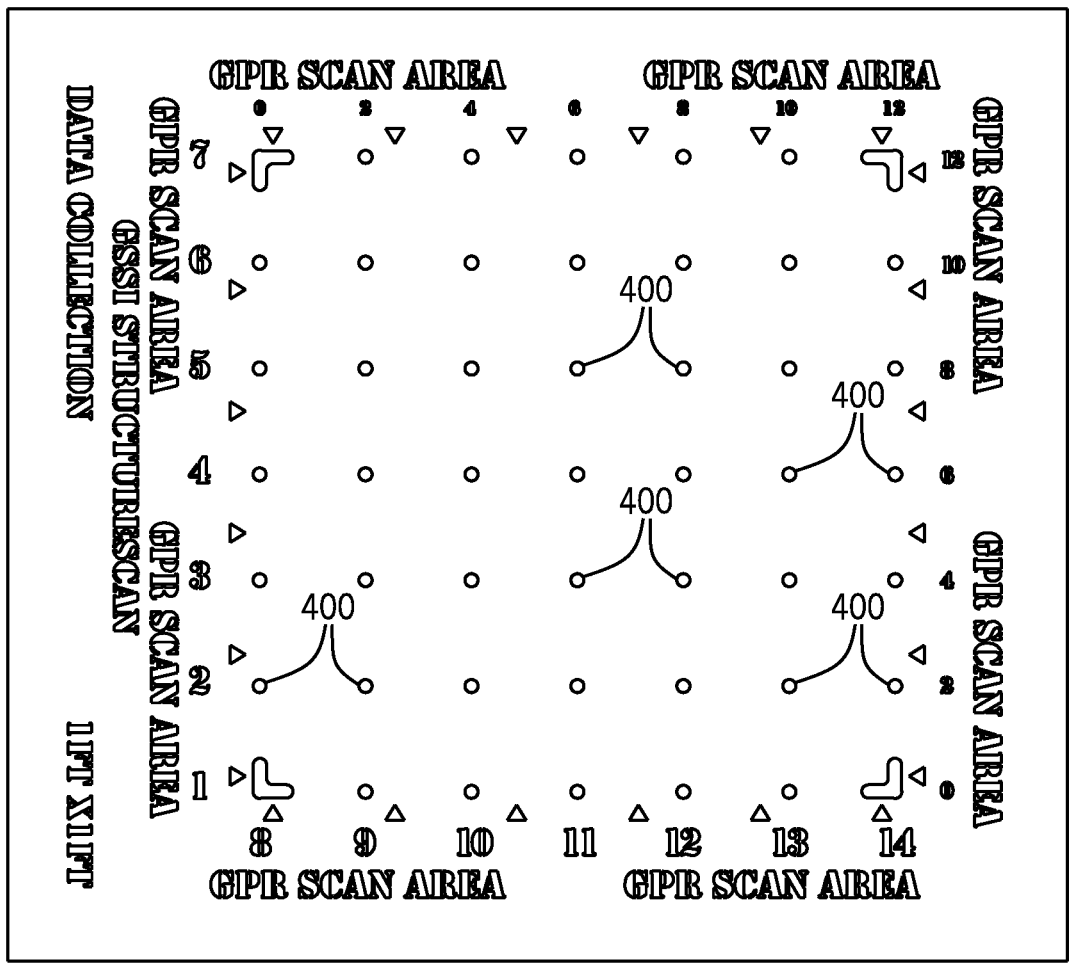
FIG. 6 illustrates one version of a Data Collection Grid stencil of the present stencil and stencil system wherein a grid is present on the stencil surface and wherein paint/ink may be applied to the stencil surface to mark the ground for scanning and recording the results by a ground penetrating radar scan.
Figure 7:
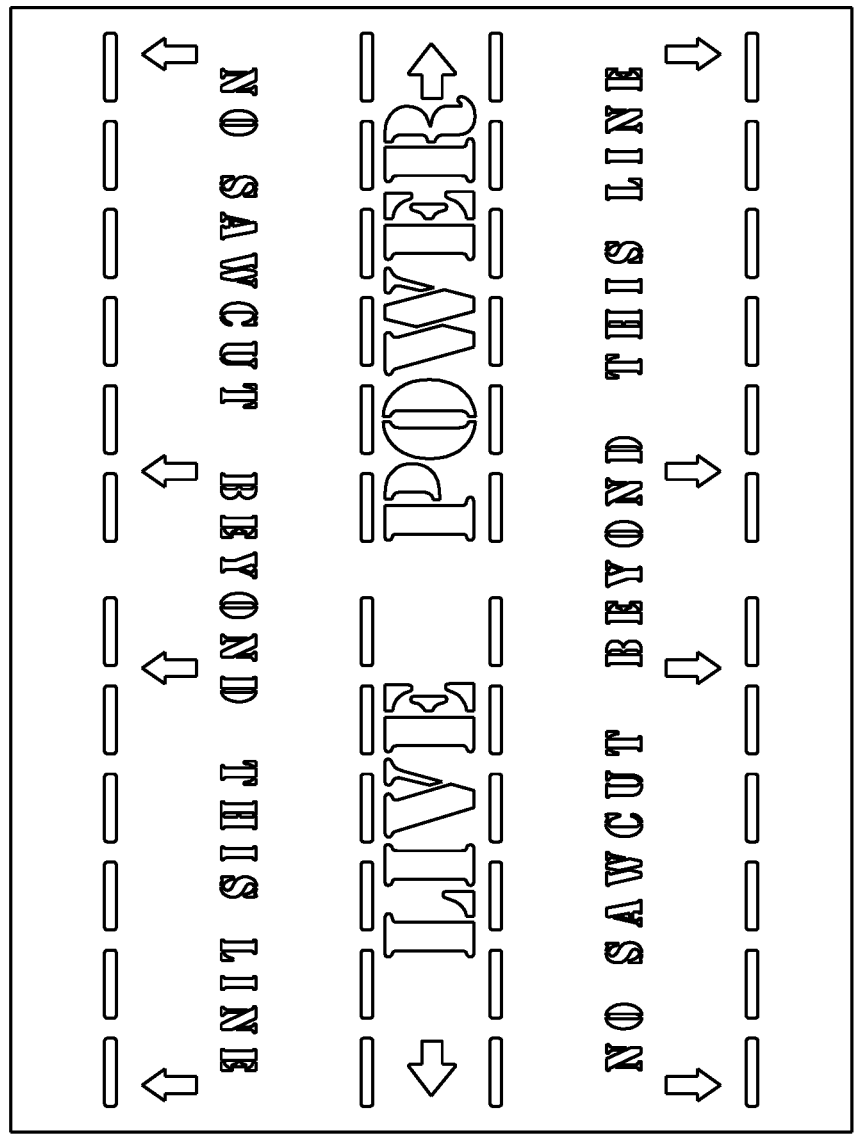
FIG. 7 illustrates an example of alternative indicia, in one embodiment, being present on a Target Marking stencil wherein the stencil of FIG. 7 has "No Sawcut beyond This Line" markings for marking the ground.

A Data Collection grid stencil (see an example in FIG. 6 of Data Collection grid stencil) is typically used before the Target Marking stencil (see an example in FIG. 1 of the Target Marking stencil). The Data Collection grid stencil is used to create a first marked grid on the ground to allow for the data to be collected to determine the locations and depths of the structures embedments. A ground penetrating radar device 90 is then used to scan over the data collection grid marks in a pre-determined sequentially numbered process (according to manufacturer's instructions). The data obtained from the radar scanning device 90 is electronically delivered to a technician (for example, a technician's computer tablet) for evaluating the information to determine the locations of the anomalies. Based on the findings of the ground penetrating radar 90, a worker then temporarily marks the centers of the embedments in a continuous pattern over the length of the survey area prior to utilizing the appropriate Target Marking stencil 1 to be used in response to the radar 90 findings.

The Target Marking stencil 1 may then be used over the already painted grid on the ground. The second stencil 1 (the Target Marking stencil 1) may be, for example, used apply paint or ink on the ground at the locations of power lines, conduits or other obstructions. A different color paint or ink may be used on the stencils. For example, the first stencil (the Data Collection grid stencil) may receive white paint or ink to mark the ground while black, green or red paint or ink (may vary based on site conditions) may be applied to the Target Marking stencil 1 depending on what is located underground by the radar device 90. In an embodiment, the markings are universal so that at a later date a different or future worker will therein understand the information printed on the ground by the first worker. The location and a unique ATS number are then marked on the ground utilizing either paint, ink, tape, labels and/or barcode stickers. This information is captured and stored by the worker in a computer database which is accessible in the future.

The present stencil and system of using the same is used to identify concealed objects 20. Typically, the concealed object 20 is embedded in the concrete structure (suspended slab, wall, beam, column or spandrel) and can often be detected on the bottom of slab on grade concrete or other surface 70 which makes knowing the precise location of the concealed object 20 difficult. This can cause problems when construction either around or actually on the concealed object 20 is required.

Figure 5:
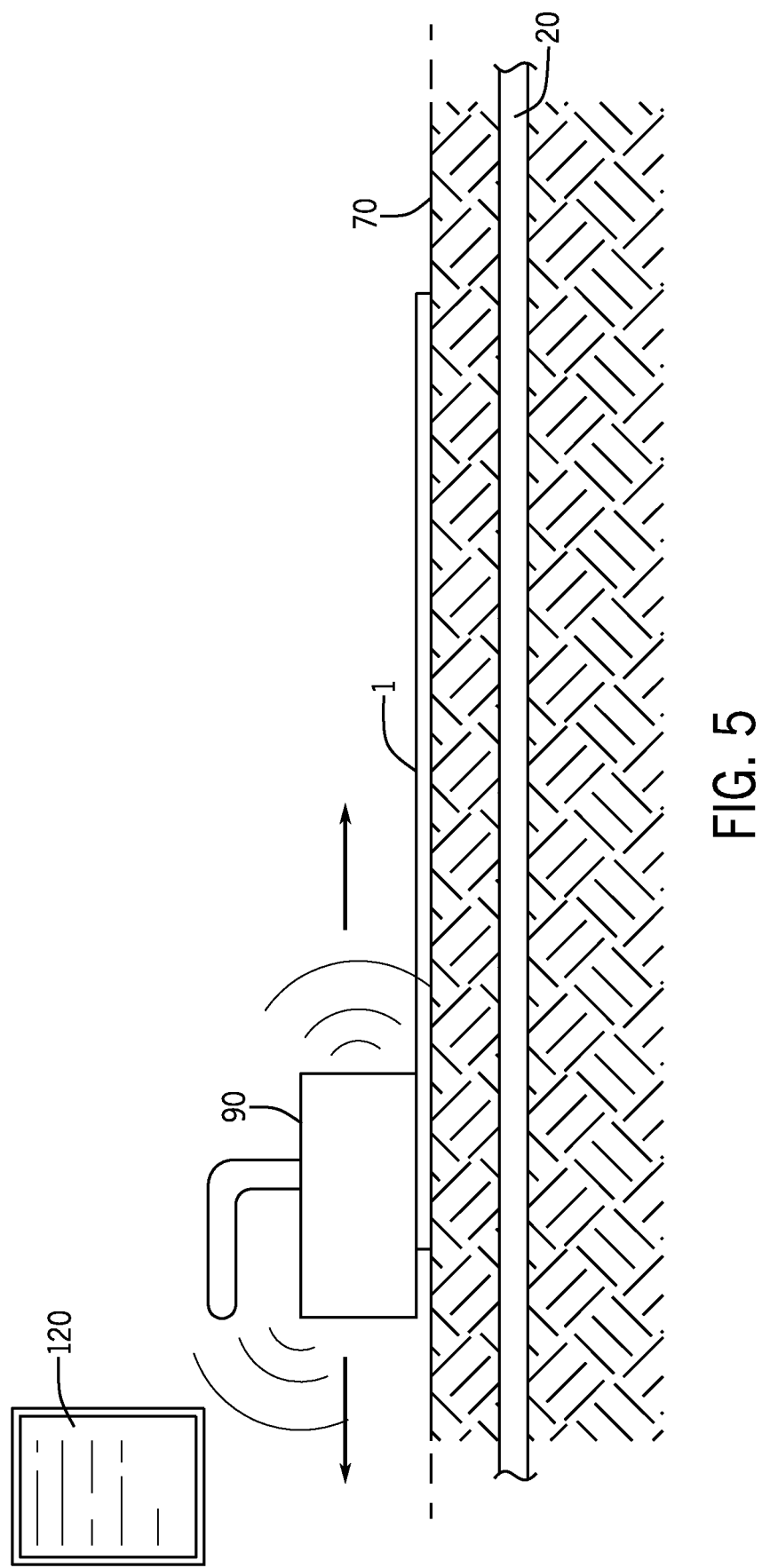
FIG. 5 illustrates a side view of a Target Marking stencil of the present stencil and system wherein the stencil is placed on the ground wherein a ground penetrating radar device is being used to locate the presence of any embedded infrastructure.

As discussed above, a ground penetrating radar device 90 (FIG. 5) such as, for example, the Hilti PS 1000™ scanner is placed over and then slowly moved across the Data Collection Grid in a pre-determined sequentially numbered process (according to manufacturer's instructions). As previously stated, the data from the radar is delivered to the processor within the GRP scanning device for evaluation to determine the locations of anomalies. Based on the findings of the ground penetrating radar 90, a worker then temporarily marks the centers of the concealed object(s) 20 in a continuous pattern over the length of the survey area prior to utilizing the appropriate Target Marking stencil 1. The Target Marking stencil 1 is then utilized to mark the concealed object(s) 20 on the floor, wall, ceiling, column, beam or other concrete surface 70.

In one alternative embodiment, located on the stencil 1 surrounding the cut-out indicia 10 displaying the concealed object 20 location may be indicia 10 related to, for example, a "safety zone" 30 (which may alternatively be called "no core layout/no saw cut beyond this point"). The safety zone 30 may allow paint or ink to be applied to the ground and may therefore display a zone for a worker to avoid during such construction procedures as core drilling, saw cutting, anchoring and demolition processes. In particular, the safety zone 30 may help a worker avoid getting too close to the concealed object 20 during cutting or drilling by setting up boundaries. Depending on the work being done and the type of concealed object 20, the safety zone 30 may be, for example, a two-inch parallel line running along each side of the concealed object line 25. The safety zone lines 30 may indicate that a worker may drill up to the safety zone line 30, but may not cross into the safety zone 30 area without risking striking the concealed object 20. In an embodiment, the drilling is core drilling and in an embodiment the cutting is diamond cutting.

Referring again to FIG. 1, in an embodiment, the stencils 1 may have a top surface 2, a bottom surface 3, a front 4, a back 5, a first side 6 and a second side 7. In an embodiment, the stencil 1 is made of Mylar® or a plastic. It should be understood that the stencil 1 may be made of other suitable materials as well. Further, in an embodiment, the stencil 1 is at least partially transparent so as to allow a worker to view the actual ground (or other surface) 70 being scanned by the radar device 90.

In an embodiment, the Mylar® Data Collection Grid or Target Marking stencil 1 may be, for example, approximately 0.014" thick (from top 2 to bottom 3), so as to provide and maintain its rigidity. As a result of the durability of the stencils 1, the stencils 1 may be reused multiple times before needing to be replaced. The heavy and durable nature of the present stencils 1 also allow a user to place the stencil 1 on the ground for data collection without the need to use securing tape or a spray adhesive, although a user can electively use those securing items.

When using the stencils 1 on, for example, a wall, ceiling or other surface 70 not parallel to the ground, a worker may use, for example, a spray adhesive 95 (FIG. 2) to secure the stencil 1 in place prior to scanning. More specifically, a worker may spray the adhesive 95 to the bottom 3 of the stencil 1 and may then secure the stencil 1 to the surface 70 to be scanned by the radar device 90. Preferably, the adhesive 95 is a temporary adhesive which is easily cleaned and removed after use so as not to damage the stencils 1 or construction surface. Alternatively, the stencil 1 may be secured in place over the surface area 70 to be scanned by use of an optional ground penetrating radar perimeter limit tape 110 (FIG. 1). In an embodiment, the tape 110 is preferably two inches wide, but alternative sizes may be used when needed.

Figure 11:
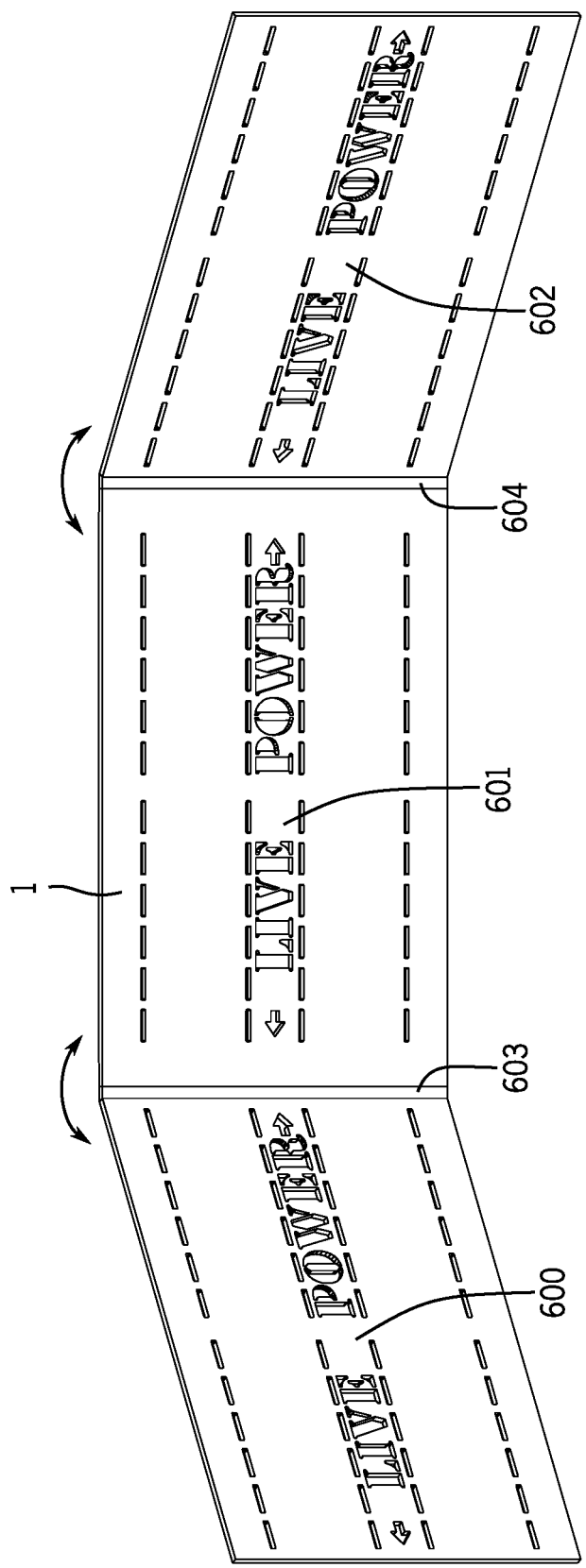
FIG. 11 illustrates an alternative embodiment of one of many possible Target Marking stencils wherein the Target Marking stencil uses a three-panel system.
Figure 12:
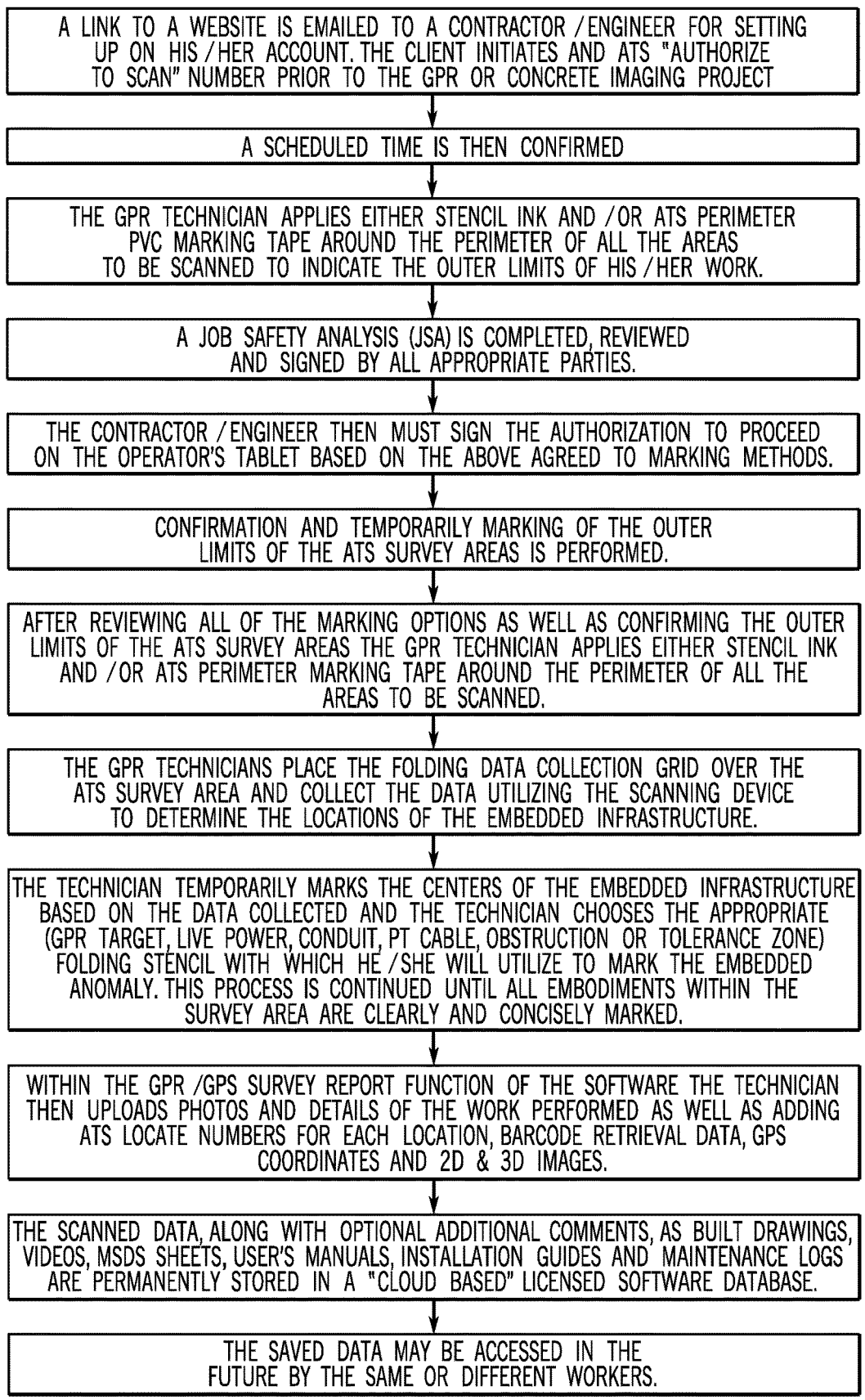
FIG. 12 illustrates a flow chart of the system for marking, scanning and storing the data.

Referring now to FIG. 11, in an alternative embodiment to the above-described stencils, the present system may have used a three-panel stencil 1. The three-panel stencil 1 may have a first panel 600, a second panel 601 and a third panel 602. The three-panel stencil 1 may have a first taped crease section 603 and a second taped crease section 604 that allow the three-panel stencil 1 to be folded twice. The three-panel stencil is especially suitable for the marking of embedded targets (i.e. a Target Marking stencil). It should be understood that the Data Collection Grid stencil or the Target Marking stencil may have any number of panels ranging from one panel to twenty-four or more panels, depending on the desired size and use of that stencil.

Figure 2:
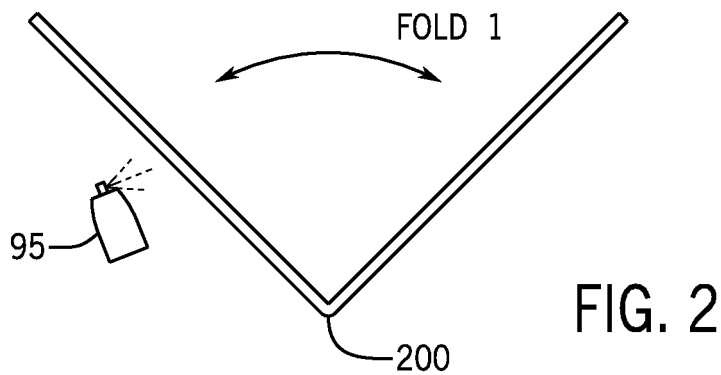
FIG. 2 illustrates a perspective view of the Data Collection Grid or the Target Marking stencil of the present stencil and system wherein the stencil is in the process of being folded a first time in one embodiment.
Figure 3:
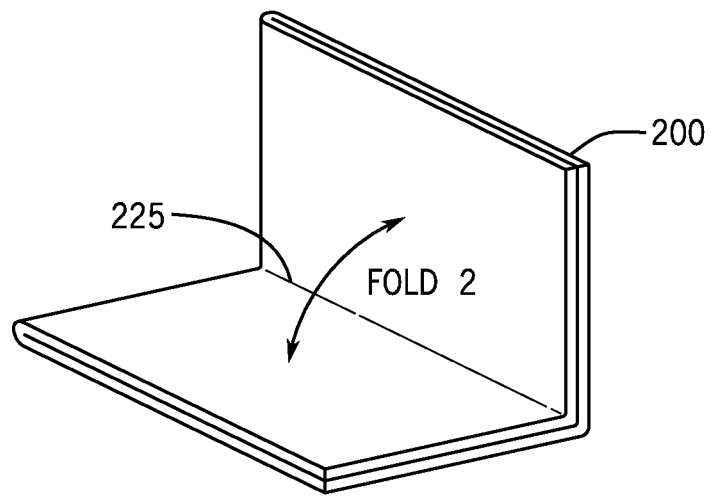
FIG. 3 illustrates a perspective view of the Data Collection Grid or Target Marking stencil of the present stencil and system wherein the stencil is in the process of being folded a second time in one embodiment.
Figure 4:
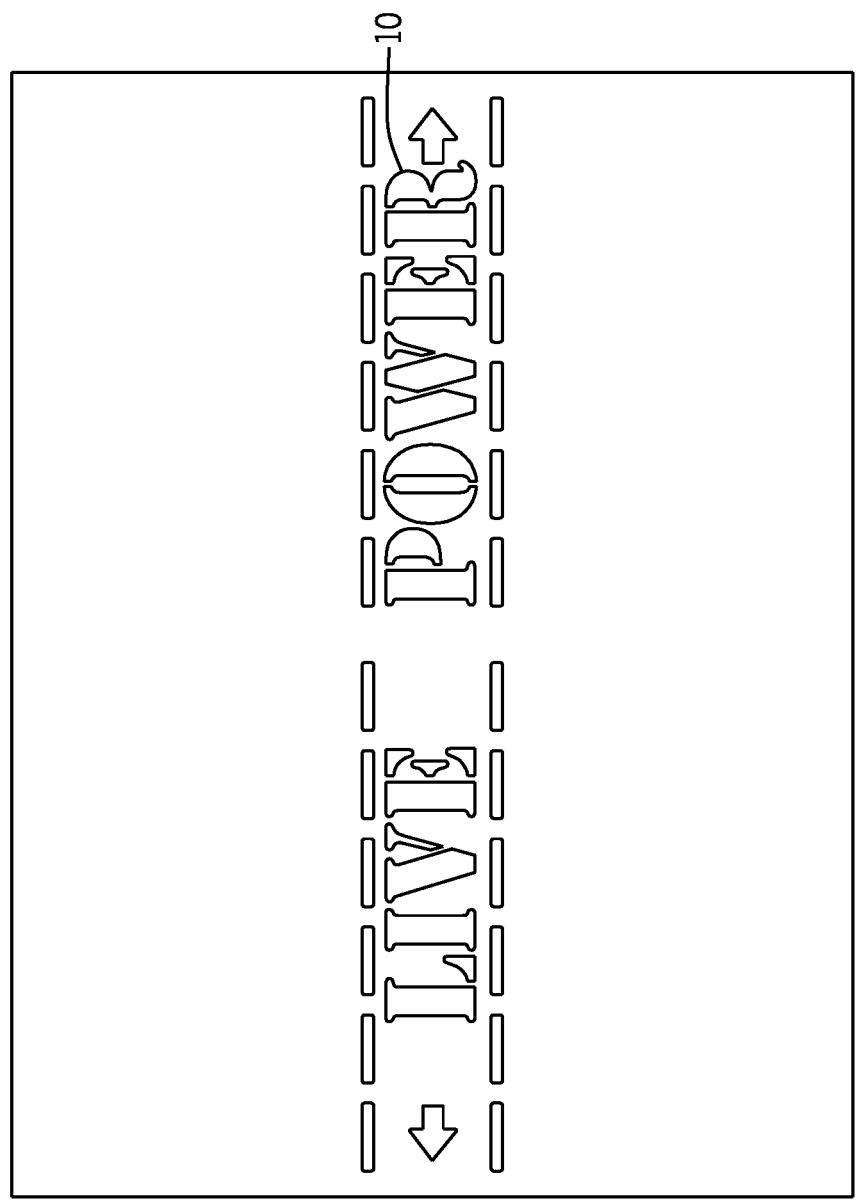
FIG. 4 illustrates a plan view of one version of a Target Marking stencil of the present system.
Figure 8:
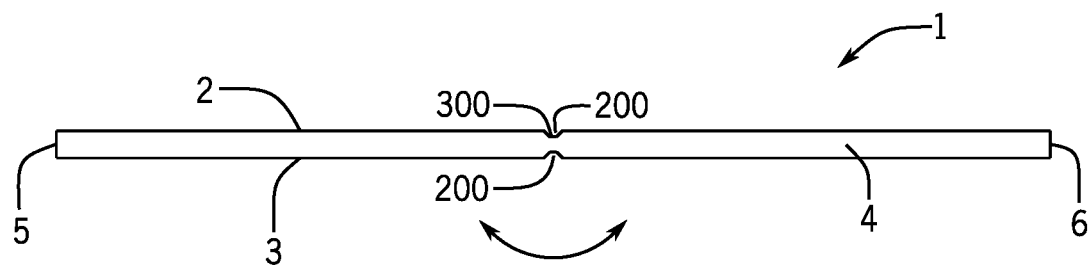
FIG. 8 illustrates a side view of a Data Collection or Target Marking stencil in one embodiment wherein an indentation channel is used on both the top and the bottom surface of the stencil to allow a user to more easily and accurately fold the stencil.

As stated above, in one embodiment, the stencils 1 may be folded. In particular, the stencils 1 may have, for example, a first fold line 200 and, in an embodiment, a second fold line 225. The fold lines 200, 225 may be, for example, either slightly perforated or may have a slight indentation channel 300 (visible from the side in FIG. 8). The first fold line 200 and the second fold line 225 may allow the stencil 1 to be folded as shown in FIGS. 2 and 3. In the folded orientation, the stencils 1 may be more easily transported and/or stored when not in use. The indentation channel 300 or perforation line may prevent a worker from folding the stencil 1 improperly.

In an embodiment, the present ground penetrating radar stencil and system for using the same may provide for standardized units of measurements. In particular, the present system may have stencils with industry-wide standardized cut-out safety zone indicia (as discussed above) which indicate an exact distance for a worker to stay away from specific buried objects 20. For example, if the embedded object 20 is a residential standard 110 volt power line, the stencil might have a safety zone of, for example, six inches. If the buried object 20 is, for example, a commercial power line, the stencil might have a safety zone of, for example, nine to twelve inches from center of the embedded object 20.

Figure 9:
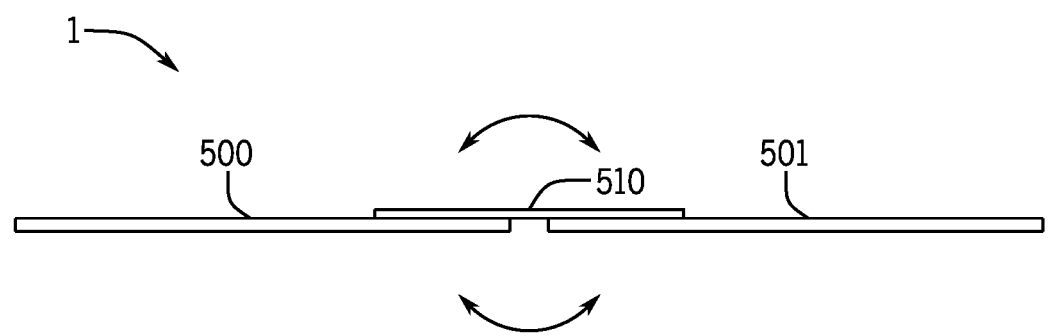
FIG. 9 illustrates an alternative embodiment of the Data Collection or Target Marking stencil wherein a fabric tape is used to bridge an (exaggerated) gap to allow the stencil to be folded and wherein the stencil is currently in the usable extended orientation.
Figure 10:
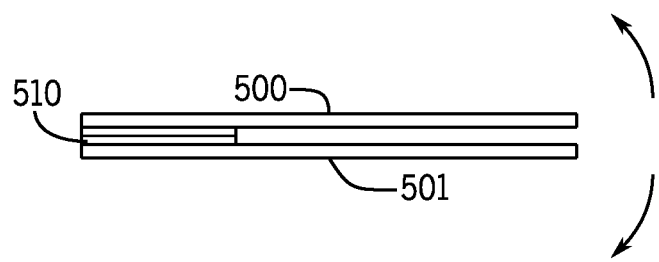
FIG. 10 illustrates an alternative embodiment of the Data Collection or Target Marking stencil wherein a fabric tape is used to allow the stencil to be folded and wherein the stencil is currently in the folded orientation.

Referring now to FIGS. 9 and 10, in an embodiment, the stencil 1 may have a first unit panel 500 and a second unit panel 501 permanently connected to each other by, for example, a tape 510. The tape 510 may be flexible, allowing the stencil 1 to fold as discussed below. The first unit panel 500 may move approximately three hundred and sixty degrees with respect to the second unit panel 501. In one embodiment, the tape 510 may be used (in an alternative embodiment to FIGS. 9 and 10, on both the upper and lower surfaces) of the first unit panel 500 and a second unit panel 501 to better connect the first unit panel 500 to the second unit panel 501. In one embodiment, the tape 510 is made of a fabric material for increased durability. The tape 510 may perform the same function as the indentation channel 300 of FIG. 8. In an embodiment, the tape 510 is only secured to the top of the first unit panel 500 and second unit panel 501 so that the underside of the stencil remains flush with the ground (for improved scanning) and remains easier to clean. In an embodiment, the tape 510 is a cloth tape for increased durability.

A user may unfold the stencil 1 from the condensed orientation of FIG. 10 into the unfolded and usable orientation of FIG. 9. In the unfolded orientation of FIG. 9, the user may place the stencil 1 on the ground 70 and follow the same procedure as outlined above. Once finished, the user may fold the stencil 1 up back into FIG. 10 for transportation and/or storage.

In one embodiment, a user may utilize tape 110 in addition to the stencil system 1 described above. In particular, when drilling and/or cutting work is to be done on a ground which might have a concealed object 20, a user first places the tape 110 on the ground 70. The stencil 1 is then placed right next to the tape 110 so that the ends of the tape 110 touch the ends of the stencil 1. The tape 110 is preferable to paint as the tape 110 may be easily removed after the work is finished, leaving the ground (which may be finished tile) in undamaged condition.

Upon completion of the GPR marking application using the stencils, the system allows for the operator to capture an image of each location utilizing a GPS camera. The GPS image of each location is captured and permanently stored within the GPR Survey Report as well as in an accessible computer database. The results of the scan (including the location of any concealed object) are then reported back to the central agency and the information is stored for future reference.

Once the stencil 1 (The Data collection Grid) is placed over the surface area 70 to be scanned by the ground penetrating radar device 90, the worker may then begin the scanning process. As the scanning is done, the worker may temporarily mark the areas in tape, crayon, pencil, soap stone or concrete etching if the areas are to be considered finished floor or wall coverings (i.e; —exposed walls or ceilings, carpet, tile, terrazzo, epoxy coating, polished or stained floors).

The data obtained by the worker using the radar scanning device 90 may be alternatively entered into a data collection device 120 (FIG. 5) to allow for additional 2D & 3D Processing. The additional tablet 120 may receive the obtained data from the ground penetrating radar device 90 by, for example, wireless communication or by an electrical cord transmitting the obtained data (IE—scanned images and/or recorded readings). The tablet and its additional software capabilities enable the aforementioned 2D & 3D imaging.

The data collected from the proper scanning of the surface 70 by the ground penetrating radar device 90 may then be stored in the GPR Scanner for short term reference and more importantly can be stored in the central data software so that future work done at or around the surface 70 may be quickly and accurately accessed by a future worker. Preferably, the data collected by the data collection device 120 may be backed-up and electrically stored within the software in a safe manner for future projects at the same (or alternative) location. The main embodiment of the system, it is the software that properly stores the recorded and obtained data.

The present system may have multiple functions including, but not limited to: a capture image function, a download files (drawings) function, a scheduling function, "touch to talk" description boxes as well as a "Docusign" agree to terms requirement function.

The below is an example of potential steps in using the present, unique scanning system:
Recommended Steps/Procedures to Follow for Ground Penetrating Radar Scanning in the Present System:
Step 1) A link to a website (utilizing the software system) is emailed to a contractor/engineer for setting up on his/her account. The client initiates and ATS 'authorize to scan" Interior Locate Tracking number prior to the GPR or concrete imaging project by submitting am electronically signed ATS request utilizing the software.
Existing licensed software clients initiate an ATS "authorize to scan" utility locate request number by filling in the appropriate job site information on their mobile app (or choose from an existing project) or their desktop link.
Step 2) The contractor/engineer and the system administrator (dispatcher) then agree on a scheduled date and time for the scanning. This scheduled time is then confirmed (generally via a required phone conversation and an email) as well as an optional text confirmation.
Step 3) Upon arrival to the site, the authorized GPR Technician reviews the guidebook, the color codes and embedded infrastructure marking options with the contractor/engineer which explains the various marking options available in the present system. The present system requires the GPR technician applies either stencil ink and/or white ATS perimeter PVC marking tape around the perimeter of all the areas to be scanned to indicate the outer limits of his/her work.
Marking Options:
Option #1: Width of "Target Marking Stencil"
1", 1.5" or 2" for all concrete surfaces. Based on how highly congested the targets are known to be. Widths can vary from location to location.
Option #2: Width of "No core zone":
6" 5", 4.5", 4", 3.5"& 3" total widths, including 1", 1.5" & 2" target width. Based on how highly congested the targets are known to be. Widths can vary from location to location.

Option #3: Type of Marking Application:
Permanent stencil paint, permanent marker, 2" wide IBGW tape, crayon, pencil, soap stone, or concrete etching. Multiple applications may be required for varying surfaces.
Option #4: Colors: Recommended:
White: For Data Collection grids and marking the outer limits of the survey areas.
Black: For Marking Targets.
Red: For Marking "Live Power" targets if the target shows up on the electromagnetic "EM" sensor.
Red: For targets perceived to be conduits or post tension cables due to their position or shape as indicated on the GPR Scan.
Blue/Black/Orange/Yellow: For Informational and Location Indicating Stencils.
In one embodiment, the contractor/engineer has the choice of changing colors based on the surface condition being scanned. Some colors may have a better appearance on certain surfaces. The GPR technician reserves the right to interchange colors based on site conditions.
Option #5: the contractor/engineer may use, for example, the Hilti PX-10® to determine exit position of core bit: Y/N
Option #6: Determine and mark approximate depths of targets to +/−1". The worker explains the limitations of ground penetrating radar and that all targets may not be seen or may not be able to be measured to a certain depth due to these limitations. All depths of targets to be performed at "best effort". Y/N
Step 6) A Job Safety Analysis (JSA) is completed, reviewed and signed by all appropriate parties.
Step 7) The contractor/engineer then must sign the authorization to proceed on the operators tablet based on the above agreed to marking methods.
Step 8) Confirm and temporarily mark the outer limits of the ATS Survey areas.
Step 9) After reviewing all of the marking options as well as confirming the outer limits of the ATS survey areas the GPR technician applies either (based on site conditions) stencil ink and/or white ATS perimeter marking tape around the perimeter of all the areas to be scanned. (The marking the perimeter of the area to be scanned is a very critical piece of the puzzle as accidents have historically occurred due to layout of cores or trenches outside of the areas, we have previously scanned.)
Step 10) The GPR technicians place the folding Data Collection grid over the ATS survey area and collect the data utilizing the scanning device to determine the locations of the embedded infrastructure. The technician temporarily marks the centers of the embedded infrastructure with the appropriate marking method (permanent marker, crayon, pencil, etc.) for the site conditions. Based on the data collected the technician chooses the appropriate (GPR TARGET, LIVE POWER, CONDUIT, PT CABLE, OBSTRUCTION OR TOLERANCE ZONE) folding stencil with which he will utilize to mark the embedded anomaly. The stencil is laid flat and centered over the target. The technician is advised to determine if the stencil needs to be temporarily taped (utilizing the appropriate tape for the conditions) to ensure accuracy. However, the technician will typically firmly hold the stencil down and apply the stencil ink with an ink roller over and through the stencil for a permanent surface marking application with minimal risk of the stencil getting misaligned. This process is continued until all embodiments within the survey area are clearly and concisely marked. Upon the completion of the stencil marking of the embedded infrastructure it is recommended that the ATS perimeter area be additionally marked with the white ATS perimeter informational PVC marking tape. At a minimum an 18" section of the white ATS tape is to be applied to the surface to alert future workers that the area has been GPR scanned, that the embedded targets have been marked and provides the future worker with a link to the data related to the critical infrastructure associated with the survey area. Within the GPR/GPS Survey Report function of the software the technician then uploads photos and details of the work performed from a GPR technician drop down task list as well as utilizes functions of the software to add ATS locate numbers for each location, barcode retrieval data, GPS coordinates and 2D & 3D images.

Step 11) The GPR technician reviews the locations, approximate depths and the applied markings with the contractor/engineer. The GPR technician, under the express written optional direction of the contractor/engineer, is then to apply the center mark core layout stencils for any suspended slab, wall, beam, column or spandrel applications. The center mark layout stencils clearly and concisely outline the center marks as well as the outer perimeters of standard core sizes in ½" increments up to 12" in diameter to minimize the risk of a cored hole or anchor hole being performed through embedded infrastructure by a core driller or worker at a future date. For slab on grade applications, the client can elect to reroute floor trenches at his own discretion to avoid any marked in or under slab utilities or structural steel. Trenches that are unable to be relocated are clearly and concisely with the 18"-24" wide tolerance zone stencils that alert future concrete saw operators or workers to avoid cutting past the tolerance zone line markings. These areas are recommended to be care scored over and chipped out by a trained authorized worker.

Step 12) The client accesses the GPR survey through his or her licensed smart phone or web-based application. The client has the ability to invite others to the project within the software to provide others access to information on the locations of the critical infrastructure for that project.

Step 13) The scanned data, along with optional additional comments, as built drawings, videos, MSDS sheets, users manuals, installation guides and maintenance logs are permanently stored in a "cloud based" licensed software database.

Step 14) The stored data of Step 13 may be accessed if the area is the be scanned again in the future.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A ground penetrating stencil system comprising:
   a stencil wherein the stencil has a top, a bottom, a front, a back, a first side and a second side;
   at least one cut-out opening forming indicia located on the top of the stencil wherein the cut-out opening passes from the top of the stencil to the bottom of the stencil;
   a marking element wherein the marking element is applied to the top of the stencil;
   a surface penetrating radar device wherein the surface penetrating radar device scans a surface for an object located beneath the surface; and
   wherein the surface penetrating radar device scans the surface after the marking element is applied to the surface through the cut-out opening of the stencil and after the stencil is removed from the surface.

2. The ground penetrating stencil system of claim 1 wherein the stencil is divided into a first unit and a second unit and therein the first unit has a top, a bottom, a front, a back, a first side and a second side;
   wherein the second unit has a top, a bottom, a front, a back, a first side and a second side; and
   at least one securing device securing the first side of the first unit to the second side of the second unit.

3. The ground penetrating stencil system of claim 2 wherein the securing device is tape.

4. The ground penetrating stencil system of claim 3 wherein the tape is a cloth-based tape.

5. The ground penetrating stencil system of claim 2 wherein the securing device is flexible and allows the first unit to rotate with respect to the second unit.

6. The ground penetrating stencil system of claim 1 wherein the stencil is made of plastic.

7. The ground penetrating stencil system of claim 1 wherein an adhesive is applied to the bottom of the stencil to secure the bottom of the stencil to the surface.

8. The ground penetrating stencil system of claim 1 wherein data collected from the surface scanning radar device is electrically transmitted to a computer and saved.

9. The ground penetrating stencil system of claim 1 wherein the indicia on the stencil is in the form of a grid.

10. A method for scanning a surface for buried objects comprising the steps of:
   providing a stencil wherein the stencil has a top, a bottom, a front, a back, a first side and a second side and at least one cut-out opening forming indicia located on the top of the stencil wherein the cut-out opening passes from the top of the stencil to the bottom of the stencil;
   providing a marking element wherein the marking element is applied to the top of the stencil; and
   providing a surface penetrating radar device wherein the surface penetrating radar device scans a surface for an object located beneath the surface.

11. The method for scanning a surface for buried objects of claim 10 further comprising the steps of:
   providing a website wherein a link to the website is sent to an electronic device;
   providing an authorized to scan number from the website; and
   marking the top of the stencil with the marking element after confirmation of the authorized to scan number is received by the electronic device.

12. The method for scanning a surface for buried objects of claim 11 further comprising the steps of:
   submitting notes to the electronic device other than information obtained by the surface scanning device.

13. The method for scanning a surface for buried objects of claim 10 further comprising the steps of:
   marking the surface with the marking element wherein the marking of the surface is in the shape of a grid.

14. The method for scanning a surface for buried objects of claim 13 further comprising the steps of:
   applying a second stencil to the markings on the surface and applying a second marking element to the second stencil.

15. The method for scanning a surface for buried objects of claim 14 wherein the second marking element is a different color than the first marking element.

16. The method for scanning a surface for buried objects of claim 14 further comprising the steps of:
   saving the data recorded by the surface scanning device on a computer.

17. The method for scanning a surface for buried objects of claim 16 further comprising the steps of:
   accessing the data recorded by the surface scanning device at a later date.

18. The method for scanning a surface for buried objects of claim 16 wherein the data recorded includes the location and date of the scanning of the surface.

* * * * *